United States Patent [19]

McGrath, Jr.

[11] Patent Number: 5,896,882
[45] Date of Patent: Apr. 27, 1999

[54] PRESSURE CONTROL VALVE

[75] Inventor: Patrick J. McGrath, Jr., Fullerton, Calif.

[73] Assignee: Northrop Grumman Corporation, Los Angeles, Calif.

[21] Appl. No.: 08/671,133

[22] Filed: Jun. 27, 1996

[51] Int. Cl.$^6$ .................................................. G05D 11/03
[52] U.S. Cl. .......................... 137/111; 137/266; 137/496; 137/517; 137/550; 137/907; 422/113; 422/117
[58] Field of Search ........................ 137/266, 111, 137/114, 496, 517, 907, 550; 422/33, 112, 113, 114, 117, 293, 296

[56] References Cited

U.S. PATENT DOCUMENTS

| | | | |
|---|---|---|---|
| 213,118 | 3/1879 | Locke | 137/496 |
| 705,369 | 7/1902 | Manley | 137/266 |
| 1,908,357 | 5/1933 | Hornbruch | 137/114 |
| 2,295,611 | 9/1942 | Smith | 137/266 |
| 2,546,678 | 3/1951 | Rockwell | 137/496 |
| 2,666,678 | 1/1954 | Carney | 309/4 |
| 3,358,680 | 12/1967 | Chabanier | 128/142.2 |
| 3,465,786 | 9/1969 | Spisak | 137/496 |
| 3,667,216 | 6/1972 | De Mattia, Jr. et al. | 60/37 |
| 3,857,373 | 12/1974 | Martin et al. | 137/496 X |
| 3,967,644 | 7/1976 | St. Laurent | 137/512.1 |
| 3,999,570 | 12/1976 | Clements | 137/517 |
| 4,499,916 | 2/1985 | Hanson | 137/907 X |
| 4,741,359 | 5/1988 | Siebald | 137/550 X |
| 4,748,003 | 5/1988 | Riley | 422/112 |
| 4,917,349 | 4/1990 | Surjastmadja et al. | 251/63 |
| 4,990,076 | 2/1991 | Lynch et al. | 422/112 |
| 5,019,345 | 5/1991 | Lorenz | 422/26 |
| 5,076,322 | 12/1991 | Choski et al. | 137/907 X |
| 5,097,865 | 3/1992 | Riley | 422/112 X |
| 5,653,251 | 8/1997 | Handler | 137/114 |

*Primary Examiner*—John Rivell
*Attorney, Agent, or Firm*—Terry J. Anderson; Karl J. Hoch, Jr.

[57] ABSTRACT

A rapid acting flow limiting valve is provided for an autoclave processing system. In this environment, each of a plurality of parts is placed in immediate proximity with a tool, then impressed into congruent engagement with the tool by an overlying vacuum bag, the interior of the vacuum bag being subjected to a vacuum via a vacuum manifold connecting all of the parts to a source of the vacuum, the interior of the vacuum bag being subjected to pressure. A first conduit leads from the chamber of the valve housing to the interior of the vacuum bag for its associated part, and a second conduit leads from the chamber to the vacuum manifold. An annular seal is positioned concentrically with an opening from the chamber into the first conduit. A flexible disk-shaped floating piston diaphragm assembly is peripherally fixed to the housing and is movable between an open position distant from the seal and a closed position engaged with the seal to thereby block flow through the first conduit. An annular spring concentric with the annular seal biases the floating piston diaphragm assembly toward the open position. Should the vacuum bag for a second part rupture, which would cause pressurized fluid flow to be introduced into the vacuum manifold toward the valve associated with the first part, the diaphragm assembly for that valve is moved to the closed position preventing pressurized fluid flow into the vacuum bag for the first part.

7 Claims, 2 Drawing Sheets

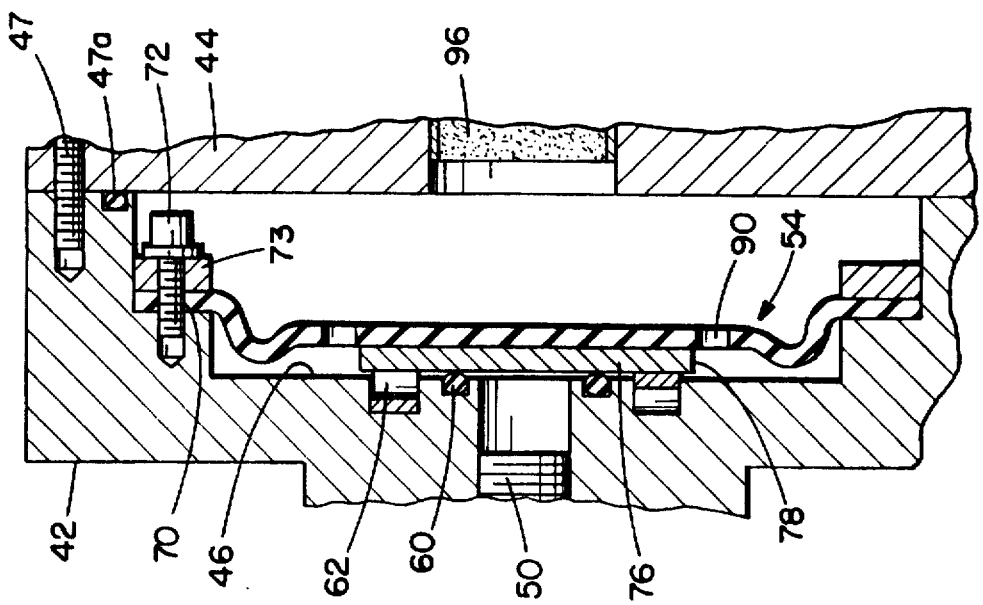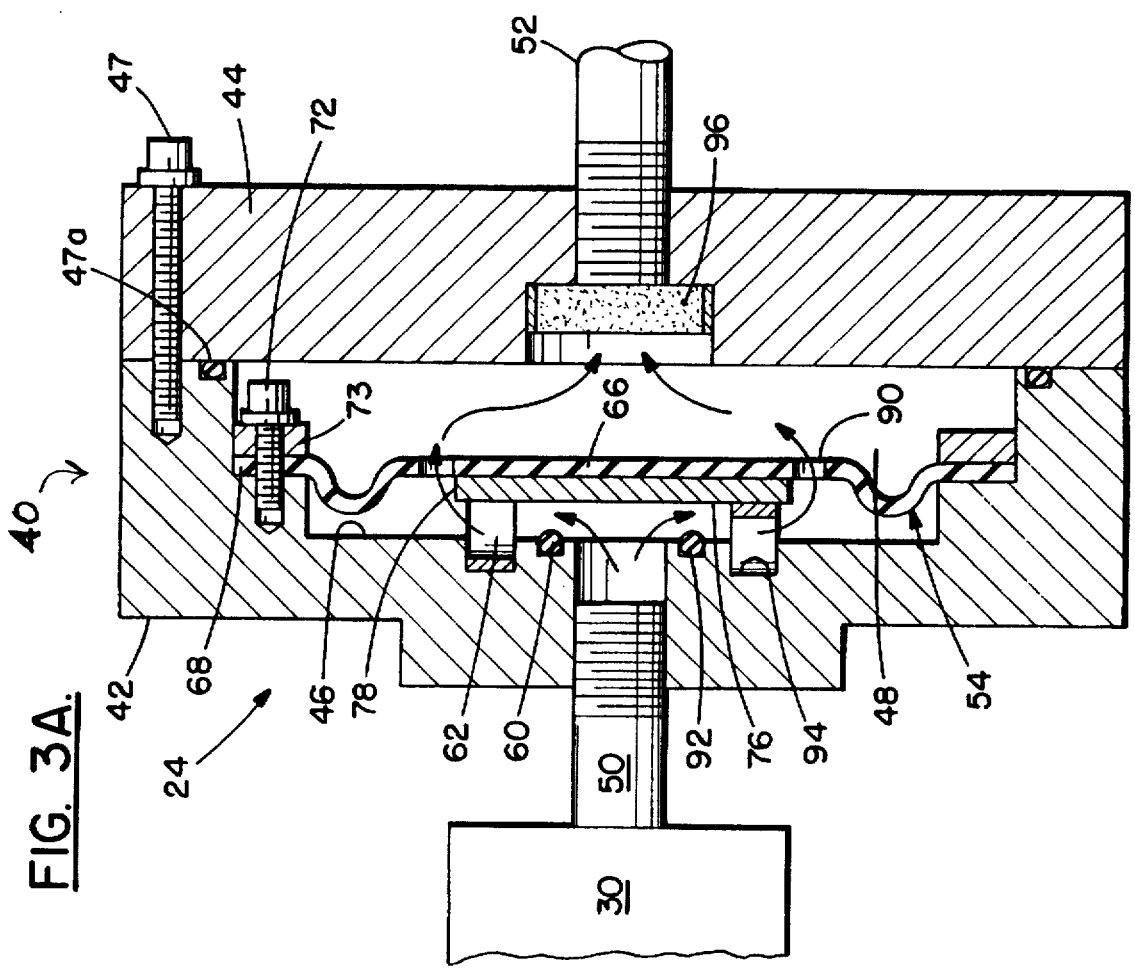

PRESSURE CONTROL VALVE

BACKGROUND OF THE INVENTION

1. Field of the Invention

The present invention relates generally to rapid acting flow limiting valves and, more particularly, to such valves intended for use with autoclave processing systems to protect multiple parts on the vacuum line from the effects of bag failure.

2. Description of the Prior Art

The application of valves in association with pressure control apparatus for autoclaves is well known as evidenced, typically, by a number of U.S. patents: U.S. Pat. No. 5,019,345 to Lorenz; U.S. Pat. No. 4,990,076 to Lynch et al.; U.S. Pat. No. 4,917,349 to Surjaatmadja; and U.S. Pat. No. 4,748,003 to Riley.

However, none of these disclosures is concerned with the problem addressed by the present invention, namely, protection to the remaining parts being processed in an autoclave when one a failure occurs with respect to one of the parts. Furthermore, known valves of the normally-open, held closed type have not been found to be satisfactory for the purpose. It was in light of the foregoing that the present invention was conceived and has now been reduced to practice.

SUMMARY OF THE INVENTION

According to the invention, a rapid acting flow limiting valve is provided for an autoclave processing system. In this environment, each of a plurality of parts is placed in immediate proximity with a tool, then impressed into congruent engagement with the tool by an overlying vacuum bag, the interior of the vacuum bag being subjected to a vacuum via a vacuum manifold connecting all of the parts to a source of the vacuum, the exterior of the vacuum bag being subjected to pressure. A first conduit leads from the chamber of the valve housing to the interior of the vacuum bag for its associated part, and a second conduit leads from the chamber to the vacuum manifold. An annular seal is positioned concentrically with an opening from the chamber into the first conduit. A flexible disk-shaped floating piston diaphragm assembly is peripherally fixed to the housing and is movable within the chamber between an open position distant from the seal and a closed position engaged with the seal to thereby block flow through the first conduit. An annular spring concentric with the annular seal biases the floating piston diaphragm assembly toward the open position. Should the vacuum bag for a second part rupture, which would cause pressurized fluid flow to be introduced into the vacuum manifold toward the valve associated with the first part, the diaphragm assembly of that valve is moved to the closed position, preventing pressurized fluid flow into the vacuum bag for the first part.

As intended, normal very low flow comes from the bag side of the system into the vacuum plenum and the flow path is through a central opening and then through a plurality of smaller openings around the periphery of the floating piston diaphragm assembly.

The net area of the plurality of the smaller openings is designed to be slightly larger than the single flow path from the bag side. This is done to preclude any adverse pressure buildup across the valve. In its normal configuration, The bagged part may already be in a vacuum environment when it is taken to the autoclave. The parts are then attached to a maintaining vacuum plenum which has little "work" to do since the parts are already drawn down after assembly and bagging.

As the autoclave process is implemented, it sometimes happens that one bag on the vacuum plenum may fail, allowing the autoclave high pressure to propagate down the vacuum plenum and into the other bagged parts on that line. It is at this point that it is desirable to insert the flow limiting valve of the invention which will protect against the line pressure exceeding a nominal value of about five to ten psi when the autoclave is pressurized to about 200 psi.

When this situation occurs, it is the design intent of the invention that the floating diaphragm mounted piston will then "see" the pressure pulse upon its relatively large area and move to seal against an o-ring seal, as will be described at length below.

A light load, wave washer may be recessed into a plane close to, and parallel to the o-ring plane. The function of this wave washer is to provide a counter load force just equal to the small mass of the piston diaphragm assembly in the vertically loaded position. Upon actuation by an overpressure pulse, the wave washer does not interfere with the piston's contact against the o-ring since it has room to flatten out in the recess. The function of the slight counterload is to assure that an adequate flow path for normal vacuum maintenance is maintained for vertical orientation of the valve.

Since there is already a vacuum in the bag for each part, the valve, once sealed against the high temperature o-ring, will maintain that seal when the pressure pulse is past and, in any event, is probably still "seeing" a large differential pressure which holds the floating piston in place. In the extreme assumption that the vacuum plenum line resumes its original function, the maintaining vacuum is still less than that required to move the flow limiting valve piston to an open position, which would still be permissible in any case.

A part of the overall design problem to be solved is to allow that valve to operate in any orientation, horizontal or vertical and still function as intended. Further, with the large differential pressure across the piston, there must be adequate stiffness in the piston assembly, coupled with the light weight design, to avoid diaphragm extrusion into the valve opening.

It should also be noted, that the valve must accept the failed bag pressure flow through the normally low flow path, which results in a high pressure differential (100+ psi) across the floating piston from the opposite side. This condition, if it failed the piston, would not result in any change in the overall pressure problem since its only consequence would be a failed diaphragm.

However, as a part of the overall, failsafe, aspect of the design, it is preferred that there will also be a powder metal, sintered, plug on the vacuum plenum side of the assembly. Such a plug permits the easy flow of gas in the seminar state, through the plug, but would contain any debris from a floating piston assembly that was failed from the pressure input side.

Accordingly, a primary object of the present invention is to provide a rapid acting flow limiting valve.

Another object of the invention is to provide a rapid acting flow limiting valve of the type intended for use with autoclave processing systems to protect multiple parts on the vacuum line from the effects of bag failure.

A further object of the present invention is to provide such a valve which is capable of operation regardless of its orientation.

Other and further features, objects, advantages, and benefits of the invention will become apparent from the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention and, together with the description, serve to explain the principles of the invention in general terms. Like numerals refer to like parts throughout the disclosure.

BRIEF DESCRIPTION OF THE DRAWINGS

FIG. 3A is a side elevation view, in section, of the valve of the invention, depicting the open position thereof; and FIG. 3B is a detail view of a portion of the construction illustrated in FIG. 3A depicting the closed position thereof.

DETAILED DESCRIPTION OF THE PREFERRED EMBODIMENT

Figure 1:
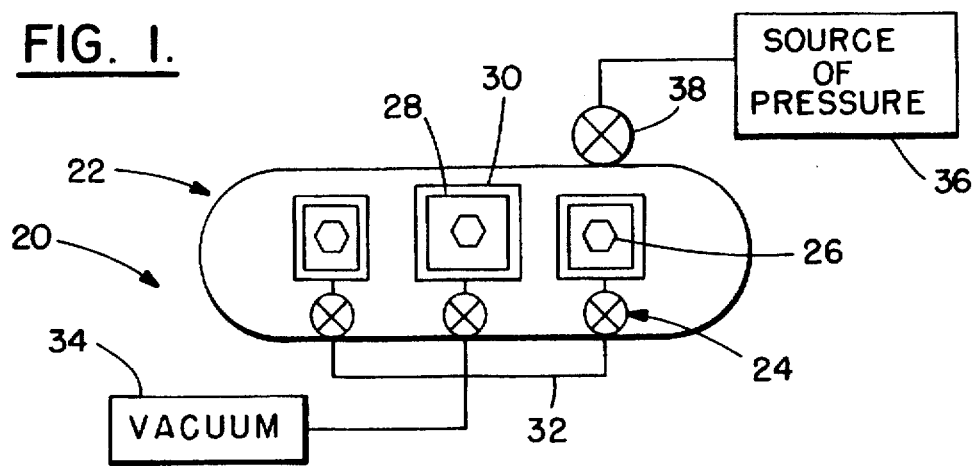
FIG. 1 is a schematic illustration of an autoclave processing system which utilizes a plurality of rapid acting flow limiting valves embodying the invention.

Turn now to the drawings, and initially to FIG. 1, which schematically illustrates an autoclave processing system 20 including an autoclave 22 utilizing a plurality of normally-open, held-closed type of valves 24 embodying the invention. In the system 20, each of a plurality of parts 26 is placed in immediate proximity with a tool 28, then impressed into congruent engagement with the tool by an overlying vacuum bag 30. The interior of the vacuum bag 30 is subjected to a vacuum via a vacuum manifold, or plenum, 32 connecting all of the parts to a suitable source of the vacuum 34. The exterior of the vacuum bag is similarly subjected to pressure, approximately 100 psi, from a suitable pressure source 36 delivered to the autoclave 22 through a pressure on/off valve 38.

The functional requirements of the system 20 include the following:

(1) flow must be open to vacuum for initial operation;

(2) the vacuum is held up until a chosen point in the cycle of operation of the autoclave; and (3) if a blanket or bag 30 containing a part 26 should break, pressure may be allowed to rise to about five psi within the bag and then the valve must shut off.

The design intent of the invention is that multiple parts 26 positioned along a vacuum line, plenum or manifold 32 in communication with a suitable source 34 of vacuum are protected from the effects of bag failure. As it now stands, prior to the use of the invention commercially, if one vacuum bag 30 fails, all the parts on the same line 32 are jeopardized.

As will be described, the concept of the invention uses a free floating piston which is lightly biased with a wave washer loading to maintain the normally open position. This condition maintains an open flow path for the normal, maintenance vacuum pull through the valve. If a bag failure occurs, the floating piston diaphragm assembly results in the back pressure loading the piston first, against the five psi closing load on the wave washer and then, with increasing pressure, sealing against an o-ring seal.

The original design intent for the autoclave flow limiting valve 24 has remained intact from the date of conception and continuing to the present time. That is, there is the need for two, seemingly contradictory functions to occur.

Specifically, the valve is intended to perform between a vacuum on one side and moderately high pressure on the other side in a raised temperature environment. The primary purpose of the valve is to protect a composite bagged part 26 (with its large incorporated costs of manufacture) from being ruined by a bag failure of another part on the same vacuum line in the high temperature and pressure autoclave environment.

Figure 2:
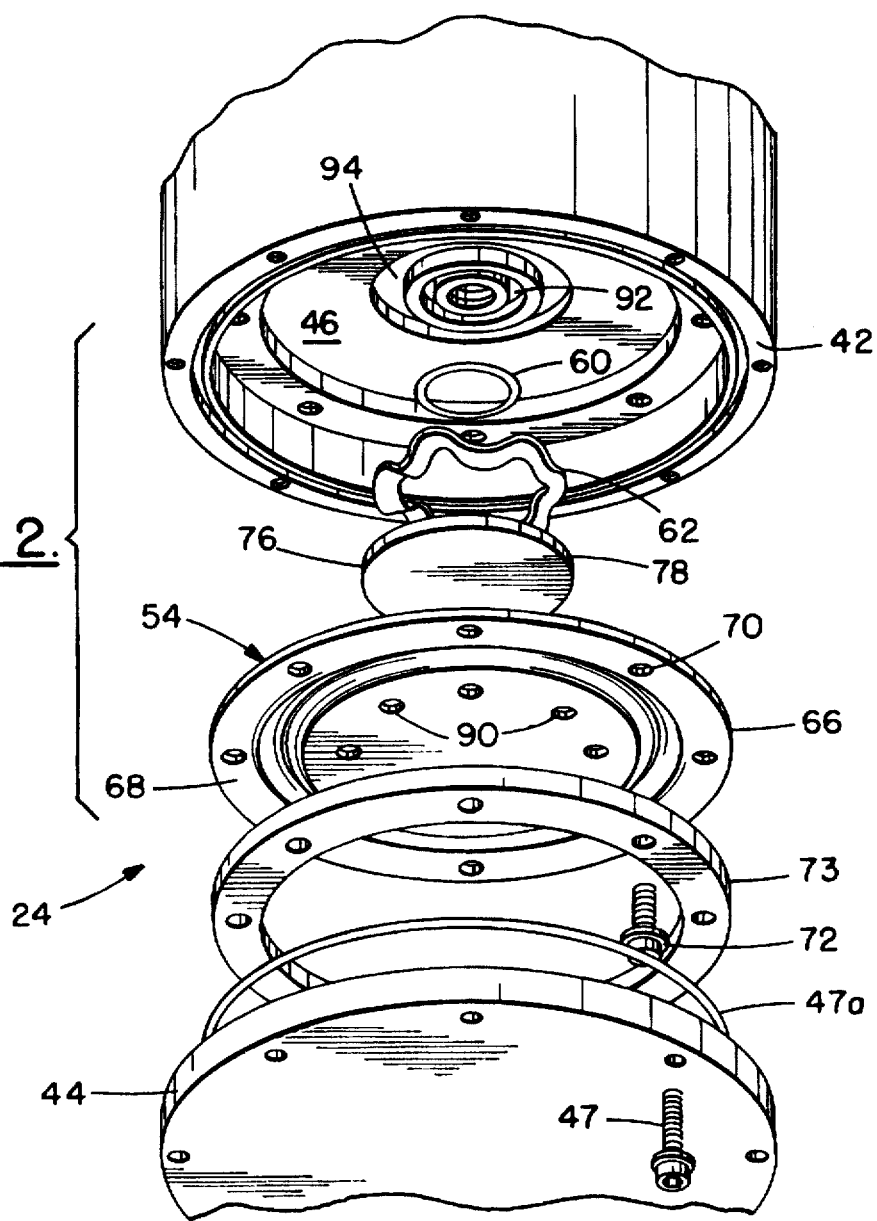
FIG. 2 is an exploded perspective view of the rapid acting flow limiting valve of the invention.

Refer now especially to FIGS. 2, 3A and 3B. According to the invention, the flow limiting valve 24 associated with each of the parts 26 includes a valve housing 40 which may be in two sections 42, 44 having an internal wall 46 which, when properly assembled in any suitable manner, as with the use of bolts 47 and seal 47A, define a valve chamber 48. A first conduit 50 attached to the housing section 42 leads from the chamber 48 to the interior of the vacuum bag 30 for its associated part 26, and a second conduit 52 attached to the housing section 44 leads from the chamber 48 to the vacuum manifold 32.

A flexible disk-shaped floating piston diaphragm assembly 54 is peripherally fixed to the valve housing and is movable between an open position illustrated in FIG. 3A and a closed position illustrated in FIG. 3B for blocking flow through the first conduit 50.

The floating piston diaphragm assembly 54 includes an annular spring 62 and a rolling diaphragm 66 having a peripheral rim 68 with apertures 70 at circumferentially spaced locations for mating attachment to the housing section 42 using suitable fasteners 72. A circumferentially apertured annular washer ring 73 is provided to assure uniform seating of the peripheral rim 68 at all locations as well as a measure of protection to the rolling diaphragm. The peripheral rim of the rolling diaphragm 66 lies in a cylindrical plane which is generally concentric with an annular seal 60 and the annular spring 62.

A contact disk 76 has a peripheral rim 78 and is suitably bonded to the surface of the rolling diaphragm 66 facing the inlet conduit 50.

The rolling diaphragm 66 also has a plurality of holes 90 at circumferentially spaced locations and at radial locations beyond the peripheral rim 78 of the contact disk 76. This construction enables fluid flow within the chamber 48 from one side to the other of the floating piston diaphragm assembly 54. As previously noted, it is the function of the vacuum manifold 32 to maintain the vacuum on the parts during cure. Since there is no major drawdown to be performed by the vacuum pump (not shown), a dynamic flow situation does not exist across the floating piston diaphragm assembly 54. The holes 90 serve to allow this very low flow in the direction of the manifold.

It will be appreciated that while the rolling diaphragm 66 and contact disk 76 have been described as being separate components joined together by a fastener mechanism, it is within the scope of the invention that those components be fabricated as a single entity while retaining the functional capabilities of the individual components as already described.

An annular seal groove 92 is formed in the internal wall 46 of the housing section 42 facing the contact disk 76 and concentric with the first conduit 50. The annular seal 60, preferably an o-ring seal, is received in the annular groove 92 and is engageable with the contact disk when the floating piston diaphragm assembly 54 is moved to the closed position (FIG. 3B).

The internal wall 46 of the valve housing 40, more specifically, of the housing section 42 additionally has an annular bias groove 94 formed therein facing the contact disk 76, concentric with the first conduit, and also with the seal groove 92. The annular spring 62 is preferably a wave washer received in the bias groove and is engaged with the contact disk for biasing the floating piston diaphragm assembly 54 toward the open position, that is, away from engagement with the o-ring 60.

The valve 24 also includes a debris filter 96 fixed on the valve housing 40 and, more specifically, in the internal wall 46 of the housing section 44 overlying the opening of the second conduit 52 into the valve chamber 48. Preferably the debris filter includes a porous sintered powder metal plug. It is a part of the overall, failsafe, aspect of the invention which urges placement of the plug on the vacuum plenum side of the valve. Such a plug permits the easy flow of gas in the laminar state, through the plug, but would contain any debris from a floating piston assembly that was failed from the pressure input side.

The debris filter 96 may be a disk of the type commercially available as Part No. D12-4F10 with an outer casing of Type 316L stainless steel manufactured by Permaflow, Inc. of Gardena, Calif. The function of the debris filter 96 is to allow the easy flow of vacuum draw into the manifold while preventing any debris which might come down the vacuum manifold line from entering the valve 24. For a failed bag situation, the diaphragm on the valve 24 is expected to be blown out or at least partially failed. The porous disk will prevent debris from entering the manifold, thus providing a double protection function. That is, no debris is allowed to exit the valve assembly, and any potential debris in the manifold cannot enter the other valve assemblies.

In operation, upon the rupture of a vacuum bag 30 for a second part which causes pressurized fluid (up to about 200 psi and at about 350 degrees F.) autoclave flow to be introduced into and through the vacuum manifold 32 toward the floating piston diaphragm assembly 54 for the valve 24 associated with a first part, the floating piston diaphragm assembly for the valve associated with the first part is rapidly moved to the closed position with the contact disk 76 in engagement with the o-ring 60 preventing pressurized fluid flow into the first conduit 50 and thereby into the vacuum bag for the first part. The contact disk provides a vacuum-pulled and pressure-driven seal to protect the bagged part 26 from the high pressure and also serves to avoid extrusion of the diaphragm into the orifice where it could be cut by the metal on the inside of the o-ring.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. In an autoclave processing system wherein each of a plurality of parts is placed in immediate proximity with a tool, then impressed into congruent engagement with the tool by an overlying vacuum bag, the interior of the vacuum bag being subjected to a vacuum via a vacuum manifold connecting all of the parts to a source of the vacuum, the exterior of the vacuum bag being subjected to pressure, a flow limiting valve associated with each of the parts comprising:

a valve housing having an internal wall defining a valve chamber, a first conduit leading from the chamber to the interior of the vacuum bag for its associated part, and a second conduit leading from the chamber to the vacuum manifold;

annular seal means mounted on said valve housing within the chamber and positioned concentrically with an opening from the chamber into said first conduit; and a flexible disk-shaped floating piston diaphragm assembly peripherally fixed to said outer housing movable between an open position distant from said seal means and a closed position engaged with said seal means to thereby block flow through the first conduit;

annular resilient means intermediate said housing and said piston diaphragm assembly and concentric with said annular seal means biasing said floating piston diaphragm assembly toward said open position;

whereby upon rupture of a vacuum bag for a second part which causes pressurized fluid flow to be introduced into and through the vacuum manifold toward said floating piston diaphragm assembly for said valve associated with a first part, said floating piston diaphragm assembly for said valve associated with the first part is moved to the closed position preventing pressurized fluid flow into the vacuum bag for the first part.

2. A rapidly acting valve capable of operating in any orientation comprising:

a valve housing having an internal wall defining a valve chamber and first and second spaced apart oppositely disposed conduits leading away from the chamber, said internal wall of said valve housing having an annular bias groove formed therein facing said contact disk and concentric with said first conduit;

annular seal means mounted on said valve housing within the chamber and positioned concentrically with an opening from the chamber into said first conduit; and a flexible disk-shaped floating piston diaphragm assembly peripherally fixed to said outer housing intermediate said first and second conduits, said floating piston diaphragm assembly being movable between an open position distant from said seal means and a closed position engaged with said seal means to thereby block flow through said first conduit, said floating piston diaphragm assembly including:

a rolling diaphragm having a peripheral rim lying in a cylindrical plane generally concentric with said annular seal means and said annular resilient means and a terminal edge engaged with said internal wall surrounding the opening into said second conduit when said floating piston diaphragm assembly is in the open position;

fastener means for attaching said peripheral rim of said rolling diaphragm to said valve housing; and a contact disk attached to said rolling diaphragm having a peripheral rim generally concentric with said annular seal means and engaged with said annular seal means when said piston diaphragm assembly is moved to the closed position; and annular resilient means intermediate said housing and said piston diaphragm assembly and concentric with said annular seal means biasing said floating piston diaphragm assembly toward said open position when said first conduit is subjected to a source of vacuum said annular resilient means including a wave washer received in said bias groove engaged with said contact disk for biasing said floating piston diaphragm assembly toward said open position;

whereby upon sudden introduction into the chamber from said second conduit of pressurized fluid, said floating piston diaphragm assembly is moved to the closed position preventing pressurized fluid flow into said first conduit.

3. A rapidly acting valve as set forth in claim 2 wherein said rolling diaphragm has a plurality of mating holes at circumferentially spaced locations and at radial locations beyond said peripheral rim of said contact disk thereby enabling fluid flow within the chamber from one side of said floating piston diaphragm assembly to the other side thereof.

4. A rapidly acting valve as set forth in claim 2 wherein said annular seal means includes:
   an annular groove formed in said internal wall of said valve housing facing said contact disk and concentric with said first conduit; and
   an o-ring seal received in said annular groove and engageable with said contact disk when said floating piston diaphragm assembly is moved to the closed position.

5. A rapidly acting valve as set forth in claim 2 including a debris filter fixed on said valve housing overlying the opening of said second conduit into the valve chamber.

6. A rapidly acting valve as set forth in claim 5 wherein said debris filter includes a porous, sintered powder metal plug.

7. A rapidly acting valve for use in an autoclave system which is simultaneously subjected to pressurized fluid from a source of pressurized fluid and to vacuum from a source of vacuum, said valve comprising:
   a housing having an internal wall defining a chamber and having an inlet into the chamber and an outlet therefrom, said internal wall of said valve housing having an annular bias groove formed therein facing said contact disk and concentric with said first conduit;
   a flexible disk shaped floating piston in the chamber having a front face, a rear face spaced from said front face, a peripheral region fixed to said housing such that said floating piston extends across the chamber, and a plurality of through bores extending between said front face and said rear face;
   mutually engageable seal means mounted on said floating piston and on said housing, respectively, for preventing fluid flow through said valve when engaged;
   said piston being movable within the chamber between a first position deflected in the direction of said front face when subjected to the vacuum from the source of vacuum and a second position deflected in the direction of said rear face when subjected to the pressurized fluid from the source of pressure; and
   resilient means biasing said piston toward the first position whereat said seal means is disengaged but capable of being overcome upon introduction of the pressurized fluid against said front face causing engagement of said seal means, said annular resilient means including a wave washer received in said bias groove engaged with said contact disk for biasing said floating piston diaphragm assembly toward said open position.

* * * * *